US011040910B2

(12) United States Patent
Donovan

(10) Patent No.: US 11,040,910 B2
(45) Date of Patent: Jun. 22, 2021

(54) PHOSPHOLIPID DEDUSTING AGENTS FOR JOINT COMPOUNDS

(71) Applicant: UNITED STATES GYPSUM COMPANY, Chicago, IL (US)

(72) Inventor: Alexander J. Donovan, Lake Forest, IL (US)

(73) Assignee: UNITED STATES GYPSUM COMPANY, Chicago, IL (US)

( * ) Notice: Subject to any disclaimer, the term of this patent is extended or adjusted under 35 U.S.C. 154(b) by 117 days.

(21) Appl. No.: 16/365,820

(22) Filed: Mar. 27, 2019

(65) Prior Publication Data

US 2019/0375681 A1 Dec. 12, 2019

Related U.S. Application Data

(60) Provisional application No. 62/681,414, filed on Jun. 6, 2018.

(51) Int. Cl.

| | |
|---|---|
| *C04B 14/18* | (2006.01) |
| *C04B 28/14* | (2006.01) |
| *C04B 14/28* | (2006.01) |
| *C04B 24/08* | (2006.01) |
| *C04B 24/38* | (2006.01) |
| *B05D 3/12* | (2006.01) |
| *C04B 14/10* | (2006.01) |
| *C04B 103/00* | (2006.01) |
| *C04B 111/00* | (2006.01) |

(52) U.S. Cl.
CPC ............. *C04B 14/18* (2013.01); *B05D 3/12* (2013.01); *C04B 14/10* (2013.01); *C04B 14/28* (2013.01); *C04B 24/085* (2013.01); *C04B 24/383* (2013.01); *C04B 28/14* (2013.01); *C04B 2103/0075* (2013.01); *C04B 2111/00681* (2013.01)

(58) Field of Classification Search
CPC ......... C04B 14/10; C04B 14/18; C04B 14/28; C04B 24/085; C04B 24/383; C04B 28/14; C04B 2103/0075; C04B 2103/00681; B05D 3/12
See application file for complete search history.

(56) References Cited

U.S. PATENT DOCUMENTS

| | | | |
|---|---|---|---|
| 4,454,267 A | 6/1984 | Williams | |
| 4,525,388 A | 6/1985 | Rehder et al. | |
| 5,746,822 A | 5/1998 | Espinoza et al. | |
| 5,779,786 A | 7/1998 | Patel | |
| 6,673,144 B2 | 1/2004 | Immordino, Jr. et al. | |
| 6,676,746 B2 | 1/2004 | Langford | |
| 6,805,741 B1 | 10/2004 | Liu et al. | |
| 8,329,785 B2 | 12/2012 | Langford | |
| 9,617,184 B2 | 4/2017 | Taboulot et al. | |
| 10,800,706 B2 * | 10/2020 | Donovan | .............. C04B 14/042 |
| 2007/0246683 A1 * | 10/2007 | Miller | ................... C04B 28/141 |
| | | | 252/88.1 |
| 2008/0141909 A1 * | 6/2008 | Immordino | ......... C04B 40/0042 |
| | | | 106/778 |
| 2011/0039984 A1 | 2/2011 | Buhler et al. | |
| 2011/0049417 A1 | 3/2011 | Swift et al. | |
| 2015/0158999 A1 | 6/2015 | Ayambem et al. | |
| 2016/0032583 A1 | 2/2016 | Xu et al. | |
| 2016/0376798 A1 | 12/2016 | Ayambem | |
| 2017/0081245 A1 | 3/2017 | Margheritis et al. | |

FOREIGN PATENT DOCUMENTS

WO 2007107779 A1 9/2007

\* cited by examiner

*Primary Examiner* — Anthony J Green
(74) *Attorney, Agent, or Firm* — Vorys, Sater Seymour and Pease LLP; Pradip Sahu; Philip T. Petti

(57) ABSTRACT

A drying-type joint compound, a setting-type joint compound, and/or a ready-mixed, setting-type joint compound can include a phospholipid dedusting agent. For example, a drying-type joint compound can include: (a) a primary filler at 50 weight percent (wt %) to 98 wt % on a dry basis, wherein the primary filler includes one of calcium carbonate, calcium sulfate dihydrate, and talc, and a mixture thereof (b) a secondary filler at up to 25 wt % on a dry basis; (c) a binder at 1 wt % to 15 wt % on a dry basis; (d) a polymer thickener at 0.05 wt % to 3 wt % on a dry basis; (e) a phospholipid dedusting agent at 0.01 wt % to 3 wt % on a dry basis; (f) an additive up to 10 wt % o on a dry basis; and (g) water at a weight ratio of water to dry components of 1:6 to 2:1.

19 Claims, 2 Drawing Sheets

PHOSPHOLIPID DEDUSTING AGENTS FOR JOINT COMPOUNDS

FIELD OF THE INVENTION

This invention relates generally to joint compounds comprising phospholipid dedusting agents.

BACKGROUND OF THE INVENTION

In the construction of buildings, one of the most common building elements is gypsum wallboard, often known as drywall or gypsum paneling, used in the construction of walls and/or ceilings. The board may be composed of any of a variety of materials, including but not limited to, cementitious materials such as, for example, cement or gypsum. Walls made from gypsum wallboard are traditionally constructed by affixing the panels to wood studs or metal framing, and treating the joints between adjoining panels with a specially prepared adhesive called a joint compound. Gypsum panels easily accommodate walls that are unusual in size and can be shaped around structural elements such as beams or pipes. The side edges of the drywall panels are tapered, thus allowing the joint compound to be applied to the seam, between adjoining panels, in such a way that a monolithic surface is created when finished. It is well known in the art that finishing a joint between boards involves at least three steps depending on the level of finish required. First, a thin layer of joint compound is applied to the boards over the joint, and a liquid-permeable paper or fiberglass tape is embedded into it. Next, a second coat of joint compound is applied over the embedded joint tape. Finally, a third coat of joint compound is applied over the first two coats, where the third coat typically extends even further out from the edges of the joint tape. Both the second and third coat may be subsequently lightly sanded upon drying. Joint compounds are also used to make repairs of defects, such as uneven surfaces, holes, depressions, gaps, dents, and other imperfections including those around electrical boxes, piping and duct work, as well as corners created by the intersection of drywall boards.

There are several categories of joint compounds. Drying type compounds cure through the evaporation of water, whereas setting type joint compounds chemically react with water during the curing process. Setting type joint compounds typically use calcium sulfate hemihydrate, also known as stucco or Plaster of Paris, as a base. When water is added to the setting type powder, it reacts with the calcium sulfate hemihydrate via a hydration reaction to form an interlocking matrix of calcium sulfate dihydrate crystals. The interlocking crystal matrix gives the compound increased strength. The benefit of a setting type joint compound over a drying type is an independence from having to wait for the joint compound to be completely dry prior to further finishing, as well as less shrinkage and cracking, and a higher overall strength of the finished joint. Drying type joint compounds have the advantage of ease of use, as they typically come in a ready mixed form, with water being added and mixed by the manufacturer. A third type of joint compound combines the setting action of a calcium sulfate hemihydrate based compound with the ease of use of a ready mixed compound. The properties of a ready mixed setting type joint compound are taught in U.S. Pat. No. 5,746,822, incorporated herein by reference.

Between coats of joint compound, and before the wall is decorated, it is recommended to sand the joint compound to even the surface. While doing so, the dust generated is generally very fine and tends to remain airborne, settling out only after long periods of time. This long residence time in the air allows it to travel long distances from the site of the wall. In a home repair, this fine dust is not confined to the area immediately adjacent to where the joint compound is being used, but is often found throughout the house, resulting in fine dust settling everywhere.

Liquid mineral oils and solid waxes (for example polyethylene glycol wax) are known to reduce dust in gypsum-based, calcium carbonate-based and perlite-based compositions and are often incorporated with the joint compounds as a dedusting agent. A dedusting agent is defined as a material with the ability to reduce the production of airborne dust generated upon sanding or other disturbance and/or with the ability to reduce the airborne residence time of the dust generated compared to a similar material without the dedusting additive. Examples of mineral oil and solid wax dedusting agents are described in U.S. Pat. No. 6,673,144 of Immordino, Jr. et al. and U.S. Pat. No. 6,676,746 of Langford.

Alternative dedusting agents that include wax emulsions and polymer coated wax core particulates have been developed, for example, as described in U.S. Patent No. 2015/0158999 Ayambem et al. and U.S. Patent Application Publication No. 2016/0376798 of Ayambem. In this example, the emulsion or polymer coating allow a solid, hydrophobic core material to be dispersed in water.

SUMMARY OF THE INVENTION

This invention relates generally to joint compounds comprising phospholipid dedusting agents.

For example, the invention may be a joint compound comprising in weight percent on a dry basis:
about 25% to about 98% filler,
about 1% to about 45% binder, and
about 0.01% to about 3% phospholipid dedusting agent.

For example, a drying-type joint compound of the invention can comprise:
(a) a primary filler at about 50 weight percent (wt %) to about 98 wt % of the drying-type joint compound on a dry basis (based on all ingredients but water), wherein the primary filler comprises one of calcium carbonate, calcium sulfate dihydrate, perlite, and talc, and a mixture thereof;
(b) a secondary filler at up to about 25 wt % of the drying-type joint compound on a dry basis;
(c) a binder at about 1 wt % to about 15 wt % of the drying-type joint compound on a dry basis;
(d) a polymer thickener at about 0.05 wt % to about 3 wt % of the drying-type joint compound on a dry basis;
(e) a phospholipid dedusting agent at about 0.01 wt % to about 3 wt % of the drying-type joint compound on a dry basis.

This drying-type joint compound may optionally also include an additive up to about 10 wt % of the drying-type joint compound on a dry basis.

Drying type joint compound of the invention may be sold to customers dry (water free) to be mixed with water at the worksite or may be pre-mixed with water to achieve a weight ratio of the water to the joint compound components other than the water of about 1:6 to about 2:1.

In this specification, the expression "joint compound components other than the water" means all the components of the joint compounds other than the water. This is a dry (water free) basis. Thus, in this specification the expression "joint compound components other than the water comprising in weight percent on a dry basis" is based on the weight of all components of the joint compound other than water. For example, the expression "the joint compound components other than the water comprising in weight percent on a dry basis about 20 wt % to about 99 wt % calcium sulfate hemihydrate" means the joint compound comprises about 20 wt % to about 99 wt % calcium sulfate hemihydrate on a dry (water free) basis. In the specification, the terms "joint compound components other than the water" and "dry components" have the same meaning.

Also for example, the invention may be a joint compound comprising in weight percent on a dry basis:
   a calcium sulfate hemihydrate at about 20 weight percent (wt %) to about 99 wt % of the setting-type joint compound on a dry basis;
   up to about 30% filler,
   up to about 8 wt % the binder;
   up to about 2 wt % the polymer thickener; and
   about 0.01% to about 3% phospholipid dedusting agent.

The calcium sulfate hemihydrate additionally causes the joint compound to set.

For example, a setting-type joint compound of the invention can comprise:
   (a) a calcium sulfate hemihydrate at about 20 weight percent (wt %) to about 99 wt % of the setting-type joint compound on a dry basis;
   (b) a filler at up to about 30 wt % of the setting-type joint compound on a dry basis;
   (c) a binder at about 0.5 wt % to about 8 wt % of the setting-type joint compound on a dry basis;
   (d) a polymer thickener at about 0.05 wt % to about 3 wt % of the setting-type joint compound on a dry basis;
   (e) a phospholipid dedusting agent at about 0.01 wt % to about 10 wt % of the setting-type joint compound on a dry basis.

Setting-type joint compound may optionally also include an additive up to about 10 wt % of the setting-type joint compound on a dry basis.

Setting-type joint compound may be sold to customers as a dry (water free) product to be mixed with water at the worksite or may be pre-mixed with water to achieve a weight ratio of the water to the joint compound components other than the water of about 1:6 to about 2:1. The joint compound pre-mixed with water is also known as ready-mixed setting-type joint compound and typically further includes a retarder to prevent premature setting of the calcium sulfate hemihydrate.

For example, a ready-mixed setting-type joint compound of the invention can comprise:
   (a) a calcium sulfate hemihydrate at about 20 weight percent (wt %) to about 99 wt % of the ready-mixed, setting-type joint compound on a dry basis;
   (b) a filler at up to about 30 wt % of the ready-mixed, setting-type joint compound on a dry basis;
   (c) a set retarder at about 0.001 wt % to about 2 wt % of the ready-mixed, setting-type joint compound on a dry basis
   (d) a binder at up to about 8 wt % of the ready-mixed, setting-type joint compound on a dry basis;
   (e) a polymer thickener at up to about 2 wt % of the ready-mixed, setting-type joint compound on a dry basis;
   (f) a phospholipid dedusting agent at about 0.01 wt % to about 3 wt % of the ready-mixed, setting-type joint compound on a dry basis; and
   (g) water at a weight ratio of water to joint compound components other than water of about 1:6 to about 2:1.

The setting-type joint compound of the invention, either sold dry or pre-mixed with water, can optionally include an additive up to about 10 wt % of the joint compound on a dry basis.

Other advantages, benefits and aspects of the invention are discussed below, are illustrated in the accompanying figures, and will be understood by those of skill in the art from the more detailed disclosure below. All percentages, ratios and proportions herein are by weight, unless otherwise specified.

As used in the present specification at the very least, and not as an attempt to limit the application of the doctrine of equivalents to the scope of the claim, each numerical parameter modified by the term "about" should at least be construed in light of the number of reported significant digits and by applying ordinary rounding techniques.

DETAILED DESCRIPTION OF THE INVENTION

Figure 1:
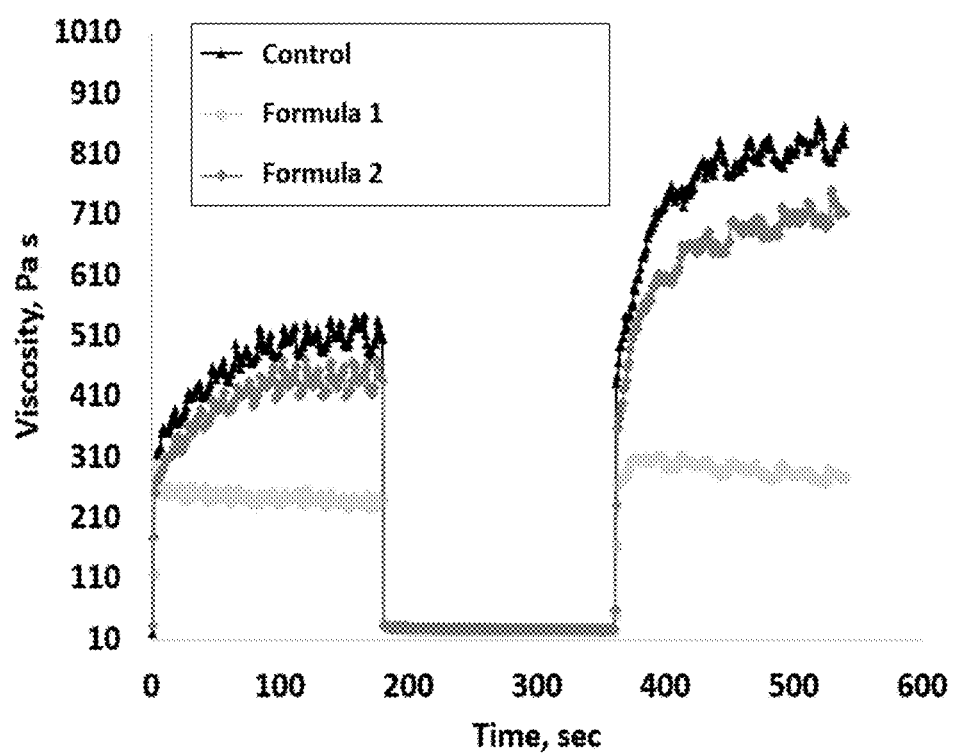
FIG. 1 illustrates the viscosity plots for a thixotropic test of three joint compounds.

All percentages and ratios used herein, unless otherwise specified, are by weight (i.e., wt %) unless otherwise indicated.

The present invention provides joint compounds comprising phospholipid dedusting agents. The phospholipid dedusting agent is generally included in the joint compound at a low concentration. Without being limited by theory, it is believed that the low concentration mitigates the phospholipid's detrimental effects as a surface active agent. Surface active agents are often used to impart dispersing, emulsifying, and foaming properties on compositions because of their ability to form self-assembled micelles and vesicles and activity at interfaces. However, such properties can reduce the performance characteristics of joint compounds like creating air bubbles or negatively altering the viscosity of the wet joint compound. Again, without limitation, the low concentrations described herein may be sufficiently low to mitigate the detrimental effects of a typical surface active agent and allow the phospholipids to impart dedusting properties.

Further, the joint compounds described herein using low concentrations of phospholipids have a preferred consistency that when dried or set has an improved smoothness as compared to traditional joint compounds. Accordingly, the dried/set joint compound may need less sanding, which further reduces the dust produced during use.

Joint Compounds

The present invention is directed, at least in part, to joint compounds with improved texture properties when dried/set and less dusting when sanded. More specifically, the joint compounds comprise a phospholipid dedusting agent.

A variety of joint compounds have been sold commercially, as well as described in printed publications and patents. Generally, such compound compositions are referred to as either "drying-type" joint compounds or "setting-type" joint compounds and are made up of a filler (e.g., calcium carbonate, calcium sulfate hemihydrate, or calcium sulfate dihydrate), thickener, preservative, and a binder, as well as various other additives like a dedusting agent. The phospholipid dedusting agents of the present invention are suitable for either type of joint compounds.

Ready mixed, drying-type joint compositions are pre-mixed with water during manufacturing and require little or no addition of water at the job site. Drying-type joint compositions can also be dry powders that are mixed with water at the job site. Drying-type joint compounds harden when the water evaporates and the compound dries. Drying-type joint compounds substantially contain a filler component. Prior to use (generally during manufacturing), the filler, a binder, a thickener, a dedusting agent, and optionally several other ingredients are mixed for a specific time with water to produce the drying-type joint compound. Such a composition has a high ionic content and basic pH. Once the drying-type joint compound is applied to the wallboard panels, the composition dries (i.e., water evaporates) and a dry, relatively hard cementitious material remains.

TABLE 1 provides examples of drying-type joint compound formulations of the present invention where the water is present in the mixture for a ready mixed, drying-type joint or the water is later mixed with the other components in the prescribed amounts. In TABLE 1 a range for a parameter in any column in TABLE 1 may be combined with the ranges for the other parameters from any other column in TABLE 1. However, preferably in TABLE 1 all the ranges in a column are used together.

The drying-type joint compounds described herein can optionally have an absence of petroleum residues. The drying-type joint compounds described herein can optionally have an absence of paraffins. The drying-type joint compounds described herein can optionally have an absence of cellulosic fibers, which are different than cellulose or cellulosic thickeners described herein. The drying-type joint compounds described herein can optionally have an absence of mineral wool. The drying-type joint compounds described herein can optionally have an absence of perlite. The drying-type joint compounds described herein can optionally have an absence of hydraulic cement. The drying-type joint compounds described herein can optionally have less than 30 wt % gypsum on a dry basis.

The drying-type joint compounds described herein can optionally have an absence of gypsum (calcium sulfate dihydrate). The drying-type joint compounds described herein can optionally have an absence of calcined gypsum (calcium sulfate hemihydrate). The drying-type joint compounds described herein can optionally have an absence of calcium sulfate anhydrite. The drying-type joint compounds described herein can optionally have less than 30 wt % total gypsum, calcined gypsum, and calcium sulfate anhydrite on a dry basis. The drying-type joint compounds described herein can optionally have an absence of starch.

The drying-type joint compounds described herein can optionally have an absence of anionic surfactants other than

TABLE 1

Drying-type (DT) joint compound formulations

| Component | Useable range | Preferred range | Most Preferred Range | Specific example |
|---|---|---|---|---|
| Primary DT Filler (wt % on a dry basis) | 50 to 98 | 50 to 93 | 65 to 93*<br>50 to 93** | 65 to 93*<br>55 to 75** |
| Secondary DT Filler (wt % on a dry basis) | up to 25 | up to 25 | 3 to 25 | 4 to 25 |
| Binder (wt % on a dry basis) | 1 to 15 | 1 to 10 | 1 to 10 | 1 to 8 |
| Polymer Thickener (wt % on a dry basis) | 0.05 to 3 | 0.1 to 3 | 0.1 to 2 | 0.5 to 2 |
| Phospholipid Dedusting Agent (wt % on a dry basis) | 0.01 to 3 | 0.05 to 2 | 0.1 to 1.5 | 0.3 to 1.0 |
| Other Additives (wt % on a dry basis) | up to 10 | 0.01 to 10 | 0.01 to 10 | 0.1 to 10 |
| Water (weight ratio of water to dry components) | 1:6 to 2:1 | 1:4 to 2:1 | 1:3 to 1:1 | 1:2 |

*calcium carbonate;
**calcium sulfate dihydrate

The drying-type joint compounds described herein can optionally have an absence of wax. The drying-type joint compounds described herein can optionally have an absence of rosin. The drying-type joint compounds described herein can optionally have an absence of shellac. The drying-type joint compounds described herein can optionally have an absence of pitch. The drying-type joint compounds described herein can optionally have an absence of fatty acids. The drying-type joint compounds described herein can optionally have an absence of tall oils. The drying-type joint compounds described herein can optionally have an absence of polyethylene glycol. The drying-type joint compounds described herein can optionally have an absence of methoxy polyethylene glycol. The drying-type joint compounds described herein can optionally have an absence of polyethylene oxide. The drying-type joint compounds described herein can optionally have an absence of methoxy polyethylene oxide. The drying-type joint compounds described herein can optionally have an absence of petroleum oil. The drying-type joint compounds described herein any phospholipid or functionalized phospholipid in the phospholipid dedusting agents. The drying-type joint compounds described herein can optionally have an absence of surfactants other than any phospholipid or functionalized phospholipid in the phospholipid dedusting agents. The drying-type joint compounds described herein can optionally have an absence of cationic surfactants other than any phospholipid or functionalized phospholipid in the phospholipid dedusting agents. The drying-type joint compounds described herein can optionally have an absence of zwitterionic surfactants other than any phospholipid or functionalized phospholipid in the phospholipid dedusting agents. The drying-type joint compounds described herein can optionally have an absence of nonionic surfactants other than any phospholipid or functionalized phospholipid in the phospholipid dedusting agents. The drying-type joint compounds described herein can optionally have an absence of galactomannan. The drying-type joint compounds described herein can optionally have an absence of polygalactomannan. The drying-type joint compounds described herein can optionally have an absence of hydrophobically modified galactomannan. The drying-type joint compounds described herein can optionally have an absence of hydrophobically modified polygalactomannan.

Typically, a drying-type joint compound formulation consists essentially of the components in TABLE 1, namely primary DT filler, secondary DT filler, binder, polymer thickener, phospholipid dedusting agent, other additives, and water. That is, the drying-type joint compound formulation includes the components of Table 1 and can optionally include other unlisted ingredients that do not materially affect the basic and novel properties of the phospholipid dedusting agent. Without being limited by theory, components that would materially affect the phospholipid dedusting agent include those that cause the phospholipid dedusting agent to form a significant number of micelles or to emulsify the joint compound. Alternatively, the drying-type joint compound formulation can consist of the components in TABLE 1.

A setting-type joint compound generally includes calcium sulfate hemihydrate ($CaSO_4 \cdot 1/2H_2O$; also referred to as calcined gypsum). Upon being mixed with water, the calcium sulfate hemihydrate is hydrated, which causes dihydrate crystals to form and interlock. Once completed, a dry, relatively hard cementitious material remains. The rehydration of calcium sulfate hemihydrate normally takes place over a fairly short period of time. Therefore, setting-type compound compositions are typically supplied to the job site in the form of a dry powder to which the user then adds a sufficient amount of water to give the compound a suitable consistency to be applied to the wall.

TABLE 2 provides examples of the dry powder of setting-type joint compound formulations of the present invention. Before use water can be added to the dry powder (also known as dry components or joint compound components other than water) at a weight ratio of water to dry powder of about 1:6 to about 2:1, preferably about 1:4 to about 2:1, more preferably about 1:3 to about 1:1, and most preferably about 1:2. In TABLE 2 a range for a parameter in any column in TABLE 2 may be combined with the ranges for the other parameters from any other column in TABLE 3. However, preferably in TABLE 2 all the ranges in a column are used together.

TABLE 2

Setting-type (ST) joint compound formulations

| Component | Useable range | Preferred range | Most Preferred Range | Specific example |
|---|---|---|---|---|
| Calcium Sulfate Hemihydrate (wt % on a dry basis) | 20 to 99 | 50 to 98 | 60 to 85 | 65 to 85 |
| ST Filler (wt % on a dry basis) | up to 30 | up to 30 | 5 to 30 | 5 to 25 |
| Binder (wt % on a dry basis) | 0.5 to 8 | 1 to 8 | 1 to 4 | 1 to 4 |
| Polymer Thickener (wt % on a dry basis) | 0.05 to 2 | 0.1 to 2 | 0.1 to 1 | 0.1 to 1 |
| Phospholipid Dedusting Agent (wt % on a dry basis) | 0.01 to 3 | 0.05 to 2 | 0.1 to 1.5 | 0.3 to 1.0 |
| Other Additives (wt % on a dry basis) | up to 10 | 0.01 to 5 | 0.1 to 5 | 0.1 to 5 |

The setting-type joint compounds described herein can optionally have an absence of wax. The setting-type joint compounds described herein can optionally have an absence of rosin. The setting-type joint compounds described herein can optionally have an absence of shellac. The setting-type joint compounds described herein can optionally have an absence of pitch. The setting-type joint compounds described herein can optionally have an absence of fatty acids. The setting-type joint compounds described herein can optionally have an absence of tall oils. The setting-type joint compounds described herein can optionally have an absence of polyethylene glycol. The setting-type joint compounds described herein can optionally have an absence of methoxy polyethylene glycol. The setting-type joint compounds described herein can optionally have an absence of polyethylene oxide. The setting-type joint compounds described herein can optionally have an absence of methoxy polyethylene oxide. The setting-type joint compounds described herein can optionally have an absence of petroleum oil. The setting-type joint compounds described herein can optionally have an absence of petroleum residues. The setting-type joint compounds described herein can optionally have an absence of paraffins. The setting-type joint compounds described herein can optionally have an absence of cellulosic fibers, which are different than cellulose or cellulosic thickeners described herein. The setting-type joint compounds described herein can optionally have an absence of mineral wool. The setting-type joint compounds described herein can optionally have an absence of perlite. The setting-type joint compounds described herein can optionally have an absence of hydraulic cement. The setting-type joint compounds described herein can optionally have an absence of starch. The setting-type joint compounds described herein prior to setting beginning can optionally have an absence of, or less than 30 wt. % on a dry basis, total gypsum (calcium sulfate dihydrate) and calcium sulfate anhydrite.

The setting-type joint compounds described herein can optionally have an absence of surfactants other than any phospholipid or functionalized phospholipid in the phospholipid dedusting agents. The setting-type joint compounds described herein can optionally have an absence of anionic surfactants other than any phospholipid or functionalized phospholipid in the phospholipid dedusting agents. The setting-type joint compounds described herein can optionally have an absence of cationic surfactants other than any phospholipid or functionalized phospholipid in the phospholipid dedusting agents. The setting-type joint compounds described herein can optionally have an absence of zwitterionic surfactants other than any phospholipid or functionalized phospholipid in the phospholipid dedusting agents. The setting-type joint compounds described herein can optionally have an absence of nonionic surfactants other than any phospholipid or functionalized phospholipid in the phospholipid dedusting agents. The setting-type joint compounds described herein can optionally have an absence of galactomannan. The setting-type joint compounds described herein can optionally have an absence of polygalactomannan. The setting-type joint compounds described herein can optionally have an absence of hydrophobically modified galactomannan. The setting-type joint compounds described herein can optionally have an absence of hydrophobically modified polygalactomannan.

Typically, a setting-type joint compound formulation consists essentially of the components in Table 2, namely calcium sulfate hemihydrate, ST filler, binder, polymer thickener, phospholipid dedusting agent, and other additives. That is, the setting-type joint compound formulation includes the components of Table 2 and can optionally include other unlisted ingredients that do not materially affect the basic and novel properties of the phospholipid dedusting agent. Without being limited by theory, components that would materially affect the phospholipid dedusting agent include those that cause the phospholipid dedusting agent to form a significant number of micelles or to emulsify the joint compound. Alternatively, the setting-type joint compound formulation can consist of the components in Table 2.

A ready-mixed, setting-type joint compound is an aqueous slurry setting-type joint compound that contains a sufficient concentration of set retarder to prevent setting before use. When ready to use, an accelerator is added in an amount to achieve a desired set time.

TABLE 3 provides examples of the ready-mixed, setting-type joint compound formulations of the present invention. In TABLE 3 a range for a parameter in any column in TABLE 3 may be combined with the ranges for the other parameters from any other column in TABLE 3. However, preferably in TABLE 3 all the ranges in a column are used together.

pounds described herein can optionally have an absence of methoxy polyethylene glycol. The ready-mixed, setting-type joint compounds described herein can optionally have an absence of polyethylene oxide. The ready-mixed, setting-type joint compounds described herein can optionally have an absence of methoxy polyethylene oxide. The ready-mixed, setting-type joint compounds described herein can optionally have an absence of petroleum oil. The ready-mixed, setting-type joint compounds described herein can optionally have an absence of petroleum residues. The ready-mixed, setting-type joint compounds described herein can optionally have an absence of paraffins. The ready-mixed, setting-type joint compounds described herein can optionally have an absence of cellulosic fibers, which are different than cellulose or cellulosic thickeners described herein. The ready-mixed, setting-type joint compounds described herein can optionally have an absence of mineral wool. The ready-mixed, setting-type joint compounds described herein can optionally have an absence of perlite. The ready-mixed, setting-type joint compounds described herein can optionally have an absence of hydraulic cement. The ready-mixed, setting-type joint compounds described herein can optionally have an absence of starch.

The ready mixed, setting-type joint compounds described herein prior to setting beginning can optionally have an absence of, or less than 30 wt. % on a dry basis, total gypsum (calcium sulfate dihydrate) and calcium sulfate anhydrite.

The ready-mixed, setting-type joint compounds described herein can optionally have an absence of surfactants other than any phospholipid or functionalized phospholipid in the phospholipid dedusting agents. The ready-mixed, setting-type joint compounds described herein can optionally have an absence of anionic surfactants other than any phospho-

TABLE 3

Ready-mixed, setting-type joint compound formulations

| Component | Useable range | Preferred range | Most Preferred Range | Specific example |
|---|---|---|---|---|
| Calcium Sulfate Hemihydrate (wt % on a dry basis) | 20 to 99 | 50 to 98 | 60 to 85 | 65 to 85 |
| ST Filler (wt % on a dry basis) | up to 30 | up to 30 | 5 to 30 | 5 to 25 |
| Set Retarder (wt % on a dry basis) | 0.001 to 2 | 0.01 to 2 | 0.1 to 1 | 0.25 to 0.75 |
| Binder (wt % on a dry basis) | up to 8 | up to 6 | up to 4 | 1 to 4 |
| Polymer Thickener (wt % on a dry basis) | up to 2 | up to 2 | 0.1 to 1 | 0.1 to 1 |
| Phospholipid Dedusting Agent (wt % on a dry basis) | 0.01 to 3 | 0.05 to 2 | 0.1 to 1.5 | 0.3 to 1.0 |
| Other Additives (wt % on a dry basis) | up to 10 | 0.01 to 5 | 0.1 to 5 | 0.1 to 5 |
| Water (weight ratio of water to dry components) | 1:6 to 2:1 | 1:4 to 2:1 | 1:3 to 1:1 | 1:2 |

The ready-mixed, setting-type joint compounds described herein can optionally have an absence of wax. The ready-mixed, setting-type joint compounds described herein can optionally have an absence of rosin. The ready-mixed, setting-type joint compounds described herein can optionally have an absence of shellac. The ready-mixed, setting-type joint compounds described herein can optionally have an absence of pitch. The ready-mixed, setting-type joint compounds described herein can optionally have an absence of fatty acids. The ready-mixed, setting-type joint compounds described herein can optionally have an absence of tall oils. The ready-mixed, setting-type joint compounds described herein can optionally have an absence of polyethylene glycol. The ready-mixed, setting-type joint comlipid or functionalized phospholipid in the phospholipid dedusting agents. The ready-mixed, setting-type joint compounds described herein can optionally have an absence of cationic surfactants other than any phospholipid or functionalized phospholipid in the phospholipid dedusting agents. The ready-mixed, setting-type joint compounds described herein can optionally have an absence of zwitterionic surfactants other than any phospholipid or functionalized phospholipid in the phospholipid dedusting agents. The ready-mixed, setting-type joint compounds described herein can optionally have an absence of nonionic surfactants other than any phospholipid or functionalized phospholipid in the phospholipid dedusting agents.

The ready-mixed, setting-type joint compounds described herein can optionally have an absence of galactomannan. The ready-mixed, setting-type joint compounds described herein can optionally have an absence of polygalactomannan. The ready-mixed, setting-type joint compounds described herein can optionally have an absence of hydrophobically modified galactomannan. The ready-mixed, setting-type joint compounds described herein can optionally have an absence of hydrophobically modified polygalactomannan.

Typically, a ready-mixed, setting-type joint compound formulation consists essentially of the components in Table 3, namely calcium sulfate hemihydrate, ST filler, set retarder, binder, polymer thickener, phospholipid dedusting agent, other additives, and water. That is, the ready-mixed, setting-type joint compound formulation includes the components of Table 3 and can optionally include other unlisted ingredients that do not materially affect the basic and novel properties of the phospholipid dedusting agent. Without being limited by theory, components that would materially affect the phospholipid dedusting agent include those that cause the phospholipid dedusting agent to form a significant number of micelles or to emulsify the joint compound. Alternatively, the ready-mixed, setting-type joint compound formulation can consist of the components in TABLE 3.

Phospholipid Dedusting Agent

The phospholipid dedusting agents used in the present invention comprise one or more phospholipids and/or functionalized phospholipids.

The phospholipid dedusting agent can be a powder mixed either with the dry components of the joint compound formulation or a joint compound slurry. Alternatively, the phospholipid dedusting agent can be dispersed in an aqueous solvent and added to the joint compound slurry. It is preferable to use the dry powder.

Examples of components phospholipid dedusting agents can include, but are not limited to, lecithin (phosphatidylcholine), phosphatidylserine, phosphatidylinositol, phosphatidylethanolamine (PE), phosphatidylglycerol, and mixtures thereof. These examples are also referred to herein as non-functionalized phospholipids. The lecithin can be de-oiled lecithin (i.e., lecithin substantially free (less than 5 wt %) of oil). The lecithin can be from natural sources including, but not limited to, soybean, egg yolk, sunflower, rapeseed, and corn.

Functionalized phospholipids include the foregoing phospholipids conjugated (or derivatized) with polyethylene glycol (PEG) or polyethylene oxide (PEO), fluorescent or chromogenic dyes, proteins, peptides, carbohydrates (e.g., cellulose, starch, modified cellulose, modified starch), sterols, fatty acids, or synthetic polymers. As used herein, a PEG functionalized phospholipid and a PEO functionalized phospholipid is not equivalent to PEG and PEO, respectively. That is, the phospholipid dedusting agent can comprise PEG functionalized phospholipid and have an absence of PEG.

Where PEG or PEO are the functional groups on a phospholipid, the weight percentage on a dry basis of the PEG or PEO is about 0.1 mol % to 10 mol % relative to the total phospholipid composition. Preferably, the invention incorporates a PEGylated phospholipid (e.g., natural phospholipids and/or synthetic phospholipids) and/or methoxypoly(ethylene glycol)-phosphatidylethanolamine (mPEG-PE) into a joint compound formulation to provide the necessary dedusting effect. A dedusting effect is the reduction in the generation of fine airborne dust produced upon sanding or other disturbance compared to disturbing a similar material without the dedusting additive and/or a reduction in the residence time of the airborne dust.

A phospholipid dedusting agent, which can comprise one or more of the foregoing or the like, can be present in compositions of the invention at a lower limit of 0.01 wt %, or 0.05 wt %, or 0.1 wt %, or 0.2 wt %, or 0.3 wt %, or 0.5 wt % on a dry basis. Further, the phospholipid dedusting agent can be present in compositions of the invention at an upper limit (in combination with any foregoing lower limit that is lower than the upper limit) of 3 wt %, or 2.5 wt %, or 2 wt %, or 1.5 wt %, or 1 wt %, or 0.5 wt % on a dry basis. In one example, when the phospholipid dedusting agent consists of non-functionalized phospholipids (e.g., lecithin), the phospholipid dedusting agent can be present in compositions of the invention at a lower limit of 0.01 wt %, or 0.05 wt %, or 0.1 wt %, or 0.2 wt %, or 0.3 wt %, or 0.5 wt % on a dry basis. Further, the phospholipid dedusting agent consisting of non-functionalized phospholipids can be present in compositions of the invention at an upper limit (in combination with any foregoing lower limit that is lower than the upper limit) of 1.5 wt %, or 1 wt %, or 0.5 wt % on a dry basis. In another example, when the phospholipid dedusting agent comprises functionalized phospholipids (e.g., PEG-lecithin) optionally with non-functionalized phospholipids, the phospholipid dedusting agent can be present in compositions of the invention at a lower limit of 0.1 wt %, or 0.2 wt %, or 0.3 wt %, or 0.5 wt % on a dry basis. Further, such phospholipid dedusting agents can be present at an upper limit (in combination with any foregoing lower limit that is lower than the upper limit) of 3 wt %, or 2.5 wt %, or 2 wt %, or 1.5 wt %, or 1 wt %, or 0.5 wt % on a dry basis.

Calcium Sulfate Hemihydrate

Setting-type joint compounds and ready-mixed, setting-type joint compounds include calcium sulfate hemihydrate. There are two principal forms used, the alpha and beta crystalline forms. In general, the alpha form is the more expensive of the two and produces a stronger product. The beta form is adequate for many uses and, being less expensive, is more commonly used. For joint compounds of the invention, either type of the hemihydrate may be used including mixtures, but the alpha form is preferred.

For setting-type joint compounds and ready-mixed, setting-type joint compounds, the calcium sulfate hemihydrate can be included at about 20 wt % to about 99 wt % on a dry basis of the joint compound, preferably about 50 wt % to about 98 wt % on a dry basis, more preferably about 60 wt % to about 80 wt % on a dry basis and most preferably about 65 wt % to about 75 wt % on a dry basis.

Fillers

Examples of fillers for joint compounds of the invention include, but are not limited to, calcium carbonate (or limestone), calcium sulfate dihydrate, talc, glass micro bubbles, mica, perlite, pyrophyllite, silica, calcium sulfate anhydrite, calcium sulfate hemihydrate (in presence in set retarder), diatomaceous earth, clay (e.g., attapulgite, sepiolite and kaolin), resin microspheres, and mixtures thereof.

Preferably filler compositions and concentrations are different for the different types of joint compounds and are distinguished herein with DT for drying-type and ST for setting-type. The ST fillers can be used in the setting-type joint compounds or the ready-mixed, setting-type joint compounds.

Drying-type joint compounds preferably include a primary DT filler and optionally a secondary DT filler. Examples of primary DT fillers include: calcium carbonate, calcium sulfate dihydrate, talc, and mixtures thereof.

For drying-type joint compounds, the primary DT filler can preferably be included at about 50 wt. % to about 98 wt. % on a dry basis of the joint compound, and more preferably about 50 wt. % to about 93 wt. % on a dry basis. For example, calcium carbonate as the primary DT filler can preferably be included in a drying-type joint compound at about 65 wt. % to about 93 wt. % on a dry basis. In another example, calcium sulfate dihydrate as the primary DT filler can preferably be included in a drying-type joint compound at about 50 wt. % to about 93 wt. % on a dry basis, and more preferably at about 55 wt. % to about 75 wt. % on a dry basis.

Examples of secondary DT fillers include, but are not limited to, glass micro bubbles, mica, perlite, pyrophyllite, silica, calcium sulfate anhydrite, diatomaceous earth, clay (e.g., attapulgite, sepiolite and kaolin), resin microspheres, and mixtures thereof. Secondary DT fillers may be useful as fillers and used to impart specific properties to the joint compounds. For example, mica aids in reduced cracking of the joint compound as it dries, and is preferred in amounts of up to 25 wt. % on a dry basis. It is also preferred to add clay in amounts of up to about 10 wt. % on a dry basis to improve the body and workability of the joint compound, and as a rheology modifier.

For drying-type joint compounds, the secondary DT filler can be included at up to about 25 wt. % on a dry basis of the joint compound, preferably about 3 wt. % to about 25 wt. % on a dry basis, and more preferably about 4 wt. % to about 25 wt. % on a dry basis.

Setting-type joint compounds and ready-mixed, setting-type joint compounds optionally include a filler. Examples of fillers for setting-type joint compounds and ready-mixed, setting-type joint compounds include, but are not limited to, calcium carbonate, calcium sulfate dihydrate, talc, glass micro bubbles, mica, perlite, pyrophyllite, silica, calcium sulfate anhydrite, diatomaceous earth, clay (e.g., attapulgite, sepiolite and kaolin), resin microspheres, and mixtures thereof. Such fillers may be useful as fillers and also used to impart specific properties to the joint compounds. For example, clay in amounts of up to about 10 wt % on a dry basis can be used to improve the body and workability of the joint compound, and as a rheology modifier. In another example, calcium carbonate can be included at about 10 wt % to about 20 wt % on a dry basis to add bulk to the joint compound.

For setting-type joint compounds and ready-mixed, setting-type joint compounds, the filler, when included, can be at about 1 wt % to about 30 wt % on a dry basis of the joint compound, preferably about 5 wt % to about 30 wt % on a dry basis, and more preferably about 5 wt % to about 25 wt % on a dry basis.

Perlite or expanded perlite is a lightweight filler that may be used where the joint compound (or drying-type, setting-type, ready-mixed, and/or setting-type) is preferably lightweight. Use of expanded perlite in a lightweight joint compound is taught in U.S. Pat. No. 4,454,267, which is herein incorporated by reference. Expanded perlite is a very lightweight material that contains many cracks and fissures. It can be treated according to the teachings of U.S. Pat. No. 4,525,388, which is hereby incorporated by reference, so that the material does not increase in weight due to water absorbed by capillary action. The treated, expanded perlite, when used, is preferably present in concentrations of at least 5 wt % on a dry basis of the joint compound.

Any joint compound of the present invention optionally includes resin microspheres as a filler to be used in place of or in addition to expanded perlite in lightweight formulations. Preferred shell resins suitable for use in the present invention are homopolymers, copolymers, or blends of homopolymers and/or copolymers formed one or more of acrylonitrile ("ACN"), vinylidene chloride ("VDC"), or methyl methacrylate ("MMA") monomers. Particularly preferred resins are polyacrylonitrile ("PACN"), polyvinylidene chloride ("PVDC"), copolymers formed from ACN and VDC, and copolymers found from ACN, VDC, and MMA. The microspheres demonstrate high resiliency to compression without collapse (non-friable) and are able to withstand the exerted shear stress (shear-stability) of a typical joint treatment manufacturing process and subsequent customer preparation.

Binders

Any binder that is suitable for use in a joint compound is appropriate for use in the present invention. The binder can enhance the adhesion of the joint compound to its substrate, typically drywall. Preferred binders are soft and pliable rather than being extremely hard. Hard binders are likely to create more fine dust particles compared to pliable polymers.

Examples of binders include, but are not limited to, polyvinyl acetate, polyvinyl alcohol, ethylene vinyl acetate co-polymer, vinyl chlorides, vinyl acrylic co-polymer, styrene acrylics, styrene butadiene, polyacrylamide, polyvinyl acrylic, latex emulsions, natural and synthetic starch, casein, and mixtures thereof.

For drying-type joint compounds, binders can be included at about 1 wt. % to about 15 wt. % on a dry basis of the joint compound, preferably about 1 wt. % to about 10 wt. % on a dry basis, and most preferably about 1 wt. % to about 8 wt. % on a dry basis.

For setting-type joint compounds, binders can be included at about 0.5 wt. % to about 8 wt. % on a dry basis of the joint compound, preferably about 1 wt. % to about 8 wt. % on a dry basis, and most preferably about 1 wt. % to about 4 wt. % on a dry basis.

For ready-mixed, setting-type joint compounds, binders, when included, can be at about 0.1 wt. % to about 8 wt. % on a dry basis of the joint compound, preferably 0.5 wt. % to about 6 wt. % on a dry basis, and most preferably about 1 wt. % to about 4 wt. % on a dry basis.

For example, latex emulsion binders are often used in joint compounds (drying-type and/or setting-type) and may be included in joint compounds of the invention. Examples include polyvinyl acetate and ethylene vinyl acetate emulsions. The amount used may range from about 1.5 wt. % to about 7 wt. % on a dry basis of the joint compound, preferably about 2 wt. % to about 5.5 wt. % on a dry basis.

The weight ratio of total fillers to total binders is preferably in the range of from about 15:1 to about 5:1.

Polymer Thickeners

Polymer thickeners are added to the joint compound of the present invention. After water is added to the composition, the thickener becomes hydrated and swells, thereby thickening the joint compound. Thickeners are useful, for example, in helping to create the body and flow properties commonly associated with joint compounds. Preferably, the thickener is selected so that it substantially hydrates during the mixing process after water is added to the composition, with little or no hydration of the thickener occurring after mixing is completed, to prevent formation of lumps in the joint compound.

Examples of polymer thickeners include, but are not limited to, ethylhydroxy ethylcellulose, hydroxypropyl methylcellulose, methylhydroxypropyl cellulose, hydroxyethyl cellulose, cellulose-based gums (e.g., xanthan gum, gum Arabic, alginate, pectin, and guar gums), and mixtures thereof.

For drying-type joint compounds, polymer thickeners can be included at about 0.05 wt. % to about 3 wt. % on a dry basis of the joint compound, preferably about 0.1 wt. % to about 3 wt. % on a dry basis, more preferably about 0.1 wt. % to about 2 wt. % on a dry basis, and most preferably about 0.5 wt. % to about 2 wt. % on a dry basis.

For setting-type joint compounds, polymer thickeners can be included at about 0.05 wt. % to about 2 wt. % on a dry basis of the joint compound, preferably about 0.1 wt. % to about 2 wt. % on a dry basis, and most preferably about 0.1 wt. % to about 1 wt. % on a dry basis.

For ready-mixed, setting-type joint compounds, polymer thickeners, when included, can be at 0.01 wt. % to about 2 wt. % on a dry basis of the joint compound, preferably about 0.1 wt. % to about 2 wt. % on a dry basis, and most preferably about 0.1 wt. % to about 1 wt. % on a dry basis.

Set Retarders

Set retarders are included in ready-mixed, setting-type joint compounds. Set retarders are optionally included in drying-type joint compounds and setting-type joint compounds and are considered one of the other additives in Tables 1 and 2.

Set retarders (or set inhibitors or set preventer) slow the setting and/or drying of the joint compounds to provide ample time to properly apply the joint compound.

Examples of set retarders include, but are not limited to, polymer compositions including acrylic acid and acrylamide monomer units (e.g., a copolymer (or a mixture of copolymers) of acrylic acid and acrylamide or a blend of a homopolymer of acrylic acid and a homopolymer of acrylamide), as described in U.S. Pat. No. 5,779,786, incorporated herein by reference.

Additional examples of non-calcium bearing phosphate set retarders include, but are not limited to, zinc hexametaphosphate, potassium tripolyphosphate, tetra sodium pyrophosphate, sodium tripolyphosphate, monoammonium phosphate, and monobasic potassium phosphate, as described in U.S. Pat. No. 5,746,822, incorporated herein by reference.

Examples of set retarders include, but are not limited to, polymer compositions including polyacrylic acid and/or a salt of polyacrylic acid, as described in U.S. Pat. No. 6,805,741, incorporated herein by reference.

For ready-mixed, setting-type joint compounds, set retarders can be included at about 0.001 wt. % to about 2 wt. % on a dry basis of the joint compound, preferably about 0.01 wt. % to about 2 wt % on a dry basis, more preferably about 0.1 wt. % to about 1 wt. % on a dry basis, and most preferably about 0.25 wt. % to about 0.75 wt. % on a dry basis.

For drying-type joint compounds and setting-type joint compounds, set retarders, when included, can be at about 0.001 wt. % to about 2 wt. % on a dry basis of the joint compound, preferably about 0.01 wt. % to about 2 wt. % on a dry basis, more preferably about 0.1 wt. % to about 1 wt. % on a dry basis, and most preferably about 0.25 wt. % to about 0.75 wt. % on a dry basis.

Set Accelerators

Set accelerators are added to ready-mixed, setting-type joint compounds at the time of use. Set accelerators are optionally included in drying-type joint compounds and setting-type joint compounds and are considered one of the other additives in Tables 1 and 2.

Set accelerators (or set initiators or activators) accelerate and/or initiate setting and/or drying of the joint compounds.

Examples of set initiators include, but are not limited to, metallic salts that provide acidic cations, such as aluminum sulfate, potassium sulfate, calcium sulfate, ferric sulfate, ferric chloride, and mixtures thereof, as described in U.S. Pat. No. 5,779,786, incorporated herein by reference. Another example of set initiators include, but are not limited to, zinc sulfate optionally in combination with iron oxide (e.g., in a weight ratio of 19:1).

Additional examples of set initiators include, but are not limited to, zinc sulfate, aluminum sulfate, sulfuric acid, hydrochloric acid, sodium hydrogen sulfate, potassium hydrogen sulfate, potassium aluminum sulfate, calcium sulfate dihydrate, and mixtures thereof, as described in U.S. Pat. No. 6,805,741, incorporated herein by reference.

Set initiators can optionally also include amine chelating agents.

Set initiators can be added to ready-mixed, setting-type joint compounds at a weight ratio to set retarders of about 1.2:1 to about 6:1, and preferably about 2:1 to about 6:1.

When used, set initiators can be included in or added to drying-type joint compounds and setting-type joint compounds at a weight ratio to set retarders of about 1.2:1 to about 6:1, and preferably about 2:1 to about 6:1.

Other Additives

Other additives optionally included in joint compounds include, but are not limited to, preservatives, fungicides, bactericides, defoaming agents, glycols, humectants, and mixtures thereof.

For drying-type joint compounds, when included, other additives (in total) can be included at about 0.01 wt % to about 10 wt % on a dry basis of the joint compound, and preferably about 0.1 wt % to about 10 wt % on a dry basis.

For setting-type joint compounds and ready-mixed, setting-type joint compounds, when included, other additives (in total) can be included at about 0.01 wt % to about 10 wt % on a dry basis of the joint compound, preferably about 0.01 wt % to about 5 wt % on a dry basis, and most preferably about 0.1 wt % to about 1.0 wt % on a dry basis.

Defoamers reduce or hinder the formation of air bubbles, which may form especially when mixing. Examples of defoamers include, but are not limited to, hydrocarbon-based, silicon-based defoamer, and mixtures thereof.

A glycol can be used in a joint compound to provide functional properties to the joint compound such as wet edge, open time, controlling drying time, and freeze/thaw stability. Examples of glycols include, but are not limited to, diethyl glycol, ethylene glycol, propylene glycol, and mixtures thereof. When included, the amount of glycol used in a joint compound of the invention is preferably in a range of about 0.1 wt % to about 1 wt % on a dry basis of the joint compound.

Methods

The joint compounds described herein can be applied to a surface (e.g., a gypsum board) and allowed to dry and/or set. The dried/set joint compound can then be dry sanded, or wet sanded or sponged. Alternatively, because the joint compounds described herein have improved smoothness when dried/set, the joint compounds can be wet sanded after drying and/or setting.

Dry sanding is generally done by rubbing with dry sandpaper, optionally with a vacuum attachment (e.g., using a drywall vacuum sander). Wet sandpaper is done for example by rubbing with wet sandpaper. Sponging is rubbing the applied joint compound with a sponge wetted with water to be damp. One or more of these can be performed with a vacuum attachment (e.g., using a drywall vacuum sander) to collect any dust formed. Alternatively or additionally, one or more of these methods can be performed in a negative pressure enclosure (e.g., a plastic enclosure with a fan to create negative pressure in the enclosure).

Clauses Describing Various Characteristics of Products of the Invention

Clause 1. A joint compound comprising in weight percent on a dry basis:
about 25% to about 98% filler,
about 1% to about 45% binder, and
about 0.01% to about 3% phospholipid dedusting agent.

Clause 2. The joint compound of clause 1, wherein the joint compound is a drying-type joint compound,
wherein the joint compound comprises in weight percent on a dry basis:
the filler, wherein the filler comprises:
a primary filler at about 50 weight percent (wt %) to about 98 wt % of the joint compound on a dry basis, wherein the primary filler is calcium carbonate, calcium sulfate dihydrate, or talc, or a mixture thereof, and
a secondary filler at up to about 25 wt % of the joint compound on a dry basis;
about 1 wt % to about 15 wt % the binder;
about 0.01 wt % to about 3 wt % the phospholipid dedusting agent;
wherein the joint compound further comprises in weight percent on a dry basis about 0.05 wt % to about 3 wt % a polymer thickener.

Clause 3. The joint compound of clause 1, wherein the joint compound is a drying-type joint compound,
further comprising water;
wherein the joint compound comprises joint compound components other than the water comprising in weight percent on a dry basis:
the filler, wherein the filler comprises:
a primary filler at about 50 weight percent (wt %) to about 98 wt % of the joint compound on a dry basis, wherein the primary filler is calcium carbonate, calcium sulfate dihydrate, or talc, or a mixture thereof, and
a secondary filler at up to about 25 wt % of the joint compound on a dry basis;
about 1 wt % to about 15 wt % the binder;
about 0.01 wt % to about 3 wt % the phospholipid dedusting agent;
wherein the joint compound components other than the water further comprise in weight percent on a dry basis about 0.05 wt % to about 3 wt % a polymer thickener; and
wherein a weight ratio of the water to the joint compound components other than the water is about 1:6 to about 2:1.

Clause 4. The joint compound of clause 3,
wherein the joint compound components other than the water comprise in weight percent on a dry basis:
about 50 wt % to about 93 wt % the primary filler, wherein the primary filler is calcium carbonate;
about 3 wt % to about 25 wt % the secondary filler;
about 1 wt % to about 10 wt % the binder;
about 0.1 wt % to about 2 wt % the polymer thickener;
about 0.1 wt % to about 1.5 wt % the phospholipid dedusting agent;
wherein the weight ratio of the water to the joint compound components other than the water is about 1:3 to about 1:1.

Clause 5. The joint compound of clause 3,
wherein the joint compound components other than the water comprise in weight percent on a dry basis:
about 65 wt % to about 93 wt % the primary filler, wherein the primary filler is calcium sulfate dihydrate;
about 3 wt % to about 25 wt % the secondary filler;
about 1 wt % to about 10 wt % the binder;
about 0.1 wt % to about 2 wt % the polymer thickener;
about 0.1 wt % to about 1.5 wt % the phospholipid dedusting agent; and
wherein the weight ratio of the water to the joint compound components other than the water is about 1:3 to about 1:1.

Clause 6. A joint compound comprising in weight percent on a dry basis:
a calcium sulfate hemihydrate at about 20 weight percent (wt %) to about 99 wt % of the setting-type joint compound on a dry basis;
up to about 30% filler,
up to about 8 wt % the binder;
up to about 2 wt % the polymer thickener; and
about 0.01% to about 3% phospholipid dedusting agent.

Clause 7. The joint compound of clause 6,
wherein the joint compound is a setting-type joint compound and comprises in weight percent on a dry basis:
about 20 weight percent (wt %) to about 99 wt % the calcium sulfate hemihydrate;
up to about 30 wt % the filler;
about 0.5 wt % to about 8 wt % the binder;
about 0.01 wt % to about 3 wt % the phospholipid dedusting agent; and
wherein the joint compound further comprises in weight percent on a dry basis: about 0.05 wt % to about 2 wt % polymer thickener.

Clause 8. The joint compound of clause 6, wherein the joint compound comprises in weight percent (wt %) on a dry basis:
about 60 wt % to about 85 wt % the calcium sulfate hemihydrate;
about 5 wt % to about 30 wt % the secondary filler;
about 1 wt % to about 4 wt % the binder;
about 0.1 wt % to about 1 wt % the polymer thickener; and
about 0.1 wt % to about 1.5 wt % the phospholipid dedusting agent.

Clause 9. The joint compound of clause 6,
wherein the joint compound is ready-mixed, setting-type joint compound further comprising water and a set retarder, and
wherein the joint compound comprises joint compound components other than the water in weight percent (wt %) on a dry basis comprising:
about 20 wt % to about 99 wt % calcium sulfate hemihydrate;
up to about 30 wt % the filler;
up to about 8 wt % the binder;
up to about 2 wt % the polymer thickener;
about 0.01 wt % to about 3 wt % the phospholipid dedusting agent; and
about 0.001 wt % to about 2 wt % the set retarder;
wherein a weight ratio of the water to joint compound components other than water is about 1:6 to about 2:1.

Clause 10. The joint compound of clause 9, wherein the joint compound comprises in weight percent (wt %) on a dry basis:
about 60 wt % to about 99 wt % the calcium sulfate hemihydrate;
about 5 wt % to about 30 wt % the filler;
about 0.1 wt % to about 1 wt % the set retarder;
up to about 4 wt % the binder;

about 0.1 wt % to about 2 wt % the polymer thickener;
about 0.1 wt % to about 1.5 wt % the phospholipid dedusting agent; and
wherein the weight ratio of the water to joint compound components other than water is about 1:3 to about 1:1.

Clause 11. The joint compound of any of clauses 1-10, wherein the phospholipid dedusting agent comprises one or more of phosphatidylcholine, phosphatidylserine, phosphatidylinositol, phosphatidylethanolamine, and phosphatidylglycerol.

Clause 12. The joint compound of any of clauses 1-10, wherein the phospholipid dedusting agent comprises one or more phospholipids conjugated with one or more of a polyethylene glycol, a polyethylene oxide, a fluorescent dye, a chromogenic dye, a protein, a peptide, a carbohydrate, a sterol, a fatty acid, and a synthetic polymer.

Clause 13. The joint compound of any of the preceding clauses having an absence of wax.

Clause 14. The joint compound of any of the preceding clauses having an absence of rosin.

Clause 15. The joint compound of any of the preceding clauses having an absence of shellac.

Clause 16. The joint compound of any of the preceding clauses having an absence of pitch.

Clause 17. The joint compound of any of the preceding clauses having an absence of fatty acids.

Clause 18. The joint compound of any of the preceding clauses having an absence of tall oils.

Clause 19. The joint compound of any of the preceding clauses having an absence of polyethylene glycol.

Clause 20. The joint compound of any of the preceding clauses having an absence of methoxy polyethylene glycol.

Clause 21. The joint compound of any of the preceding clauses having an absence of polyethylene oxide.

Clause 22. The joint compound of any of the preceding clauses having an absence of methoxy poly ethylene oxide.

Clause 23. The joint compound of any of the preceding clauses having an absence of petroleum oil.

Clause 24. The joint compound of any of the preceding clauses having an absence of petroleum residues.

Clause 25. The joint compound of any of the preceding clauses having an absence of paraffins.

Clause 26. The joint compound of any of the preceding clauses having an absence of wax, rosin, shellac, pitch, fatty acids, tall oils, polyethylene glycol, methoxy polyethylene glycol, polyethylene oxide, methoxy polyethylene oxide, petroleum oil, petroleum residues, and paraffins.

Clause 27. The joint compound of any of the preceding clauses having an absence of galactomannan.

Clause 28. The joint compound of any of the preceding clauses having an absence of polygalactomannan.

Clause 29. The joint compound of any of the preceding clauses having an absence of hydrophobically modified galactomannan.

Clause 30. The joint compound of any of the preceding clauses having an absence of hydrophobically modified polygalactomannan.

Clause 31. The joint compound of any of the preceding clauses having an absence of galactomannan, polygalactomannan, hydrophobically modified galactomannan, and hydrophobically modified polygalactomannan.

Clause 32. The joint compound of any of the preceding clauses having an absence of starch.

Clause 33. The joint compound of any of the preceding clauses having an absence of cellulose fibers.

Clause 34. The joint compound of any of the preceding clauses having an absence of mineral wool.

Clause 35. The joint compound of any of the preceding clauses having an absence of perlite.

Clause 36. The joint compound of any of the preceding clauses having an absence of hydraulic cement.

Clause 37. The joint compound of any of the preceding clauses having an absence of starch, cellulose fibers, mineral wool, perlite, and hydraulic cement.

Clause 38. The joint compound of any of the preceding clauses having an absence of an anionic surfactant other than the phospholipids and/or functionalized phospholipids of the phospholipid dedusting agent.

Clause 39. The joint compound of any of the preceding clauses having an absence of a cationic surfactant other than the phospholipids and/or functionalized phospholipids of the phospholipid dedusting agent.

Clause 40. The joint compound of any of the preceding clauses having an absence of a nonionic surfactant other than the phospholipids and/or functionalized phospholipids of the phospholipid dedusting agent.

Clause 41. The joint compound of any of the preceding clauses having an absence of a zwitterionic surfactant other than the phospholipids and/or functionalized phospholipids of the phospholipid dedusting agent.

Clause 42. The joint compound of any of the preceding clauses having an absence of surfactant other than the phospholipids and/or functionalized phospholipids of the phospholipid dedusting agent.

Clause 43. The joint compound of any of clauses 1-6, wherein the joint compound has an absence of gypsum.

Clause 44. The joint compound of any of clauses 1-6, wherein the joint compound has an absence of calcined gypsum.

Clause 45. The joint compound of any of clauses 1-6, wherein the joint compound has an absence of gypsum and calcined gypsum.

Clause 46. The joint compound of any of clauses 1-6, wherein the joint compound has an absence of host particles.

Clause 47. A method comprising:
applying the joint compound of any of clauses 1-46 to a surface;
drying and/or setting the joint compound; and
dry sanding the joint compound after drying and/or setting.

Clause 48. A method comprising:
applying the joint compound of any of clauses 1-46 to a surface;
drying and/or setting the joint compound; and
wet sanding the joint compound after drying and/or setting.

EXAMPLES

In the examples herein, as mentioned above, percentages of compositions or product formulae are in weight percentages, unless otherwise expressly stated. The reported measurements also in approximate amounts unless expressly stated, for example, approximate percentages, weights, temperatures, distances or other properties.

Example 1. Drying-type joint compounds were produced according to TABLE 4 where the dedusting agent in Formula 1 was de-oiled soybean lecithin. The Control had no lecithin. Except for the weight ratio of water to dry components, all amounts of components of TABLE 4 are on a dry (water free) weight percent basis.

TABLE 4

| Example formulations | | |
| --- | --- | --- |
| Component | Control | Formula 1 |
| Calcium carbonate (wt % on a dry basis) | 81.8 | 78.8 |
| Perlite (wt % on a dry basis) | 11 | 11 |
| Lecithin (wt % on a dry basis) | 0 | 0.5 |
| Water swelling clays (wt % on a dry basis) | 3.5 | 3.5 |
| Latex emulsion binder (wt % on a dry basis) | 2.3 | 4.6 |
| PVA binder (wt % on a dry basis) | 0 | 0.2 |
| Cellulosic thickeners (wt % on a dry basis) | 1.1 | 1.1 |
| Other additives* (wt % on a dry basis) | 0.3 | 0.3 |
| Water (weight ratio of water to dry components) | 0.75:1 | 0.75:1 |

*including biocide

The joint compounds were tested for the amount of dust produced when the dried joint compound was sanded for 40 seconds in an enclosed room with consistent force. The average dust was measured using a dust tracking device for 15 minutes. The Control sample produced an average of 9.5 mg/m$^3$ of dust, while Formula 1 produced an average of 4.3 mg/m$^3$ of dust, which is a 55% decrease in dust produced. This example illustrates that at low concentrations, the phospholipid dedusting agents of the present invention significantly reduce dust production.

Further, the two dried joint compounds were compared visually, and Formula 1 had a greater smoothness when dried/set, which would need less sanding to provide a desired appearance.

Example 2. Additional formulations with de-oiled soybean lecithin as the phospholipid dedusting agent were prepared. At concentrations of 1.5 wt % de-oiled soybean lecithin and greater, the consistency of the joint compounds after adding was not ideal and suggested a high level of a dispersant or surface active agent, which was detrimental to the compositions functioning as a joint compound.

Example 3. A drying type joint compound formulation containing 2.0 wt % PEG (approximately 800 g/mol or less molecular weight) on a dry basis as the dedusting agent reduced average dust concentration by 60.1% compared to a control formula without a dedusting additive. Further, a comparable drying-type joint compound formulation with 0.5 wt % de-oiled soybean lecithin on dry basis as the dedusting agent reduced dust by 55% relative to control without dedusting additive. This suggests that lecithin may be significantly more efficient as a dedusting additive on a weight and molar basis. These joint compound formulations were all sanded following the same experimental protocol described above.

Example 4. The properties of three joint compounds were examined: Control (TABLE 4), Formula 1 (TABLE 4), and Formula 2 (Formula 1 of TABLE 2 except 2.0 wt % PEG (approximately 800 g/mol as in Example 3) instead of lecithin.

The thixotropic properties of the three joint compounds were tested by applying shear to the samples according to: high shear drilling to remove structure, 3 minutes at shear rate 0.2/s, then 3 minutes at shear rate 10/s, then 3 minutes at shear rate 0.1/s. The thixotropic test achieves a steady state condition then cause drastic change to identify the response time of the fluid. FIG. 1 is the viscosity profiles for the thixotropic test. TABLE 5 lists the viscosity of the samples at low and high shear rates.

TABLE 5

| | Control | Formula 1 | Formula 2 |
| --- | --- | --- | --- |
| Viscosity at 0.2/s (Pa s) | 513 | 237 | 439 |
| Viscosity at 10/s (Pa s) | 28 | 24 | 26 |

The Control and Formula 2 samples have a rebuilding profile at the low shear rates where the viscosity increases over time. Formulations with a rebuilding viscosity will thicken over short time periods not due to water evaporation but because of interactions between components in the formulations. For joint compounds, that translates to the formulation thickening after mixing if additional shear is not applied. In contrast, Formula 1 has a profile that does not rebuild. Accordingly, after mixing, Formula 1 will likely maintain the viscosity and be more manageable to work with without having to apply shear again. For example, the joint compound would maintain a lower, more flowable viscosity on a trowel. Further, as illustrated in TABLE 5, the viscosity of each formulation at high shear rate (10/s) is comparable, so spreading of each formulation would be comparable.

Figure 2:
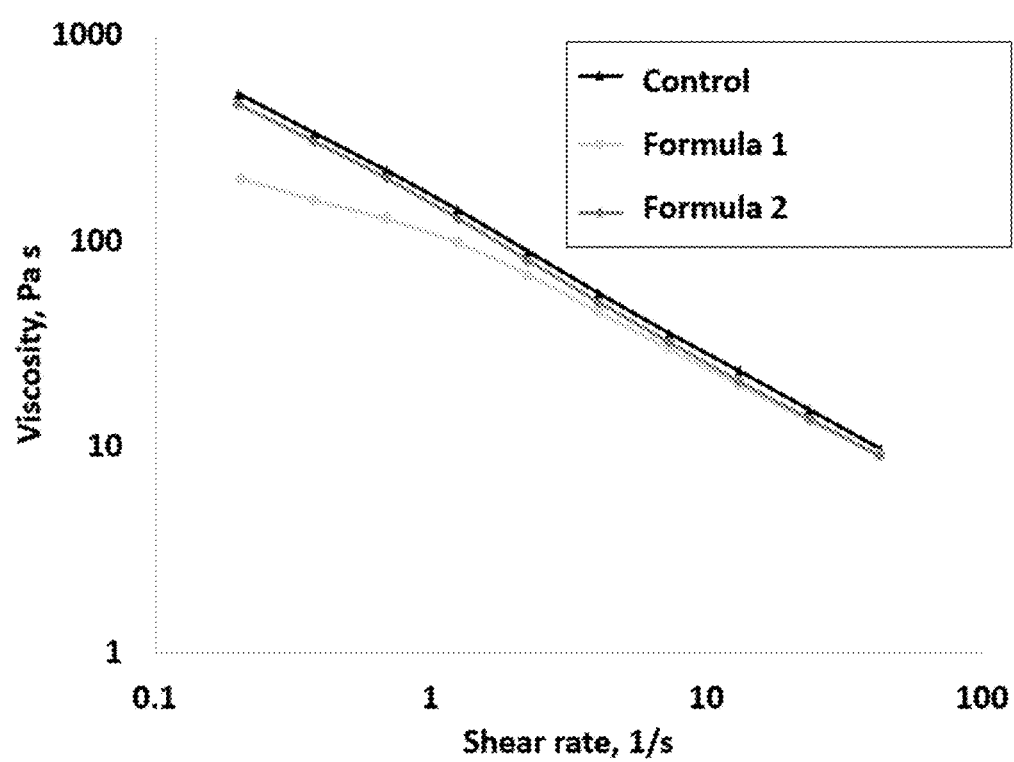
FIG. 2 illustrates viscosity plots with increasing shear rate ('shear rate ramp test') for three joint compounds.

The viscosity of the samples were also measured with increasing shear rate illustrated in FIG. 2, referred to as a shear-rate ramp test to those knowledgeable in the art. For each, at shear rates above about 1/s, there is a steady downward slope of the plots. This indicates that the samples are shear-thinning (i.e. flowable), non-Newtonian fluids. At lower shear rates, the Control and Formula 2 samples maintain this behavior. However, Formula 1 with the lecithin dedusting agent exhibits more of a Newtonian behavior, which means that it will flow better at lower shear rates. This is consistent with the thixotropic data above.

Next, the properties of the dried joint compounds were tested. In a first test, the joint compounds were spread on drywall with an Ames flat box and allowed to dry. After drying the number of defects (craters and pinholes) in the dried joint compound were counted. Then, the joint compound was sanded and the number of defects counted again. Table 6 shows these samples after sanding. The Control sample had 20 defects before sanding and 50 defects after sanding; the Formula 1 sample had 3 defects before sanding and 20 defects after sanding; and the Formula 2 sample had 5 defects before sanding and 4 defects after sanding. Both the lecithin and PEG additives have fewer defects than the control.

TABLE 6

| Number of Craters and Pinholes | | | |
| --- | --- | --- | --- |
| Defects by Finishing Step | Control | Formula 1 | Formula 2 |
| Craters and pinholes before sanding | 20 | 3 | 5 |
| Craters and pinholes after sanding | 50 | 20 | 4 |

Finally, dried joint compounds applied to drywall were painted. The Control was applied to two surfaces and painted. After the paint dried, the gloss of the paint was measured with a gloss meter in at least 5 areas of the painted surfaces. TABLE 7 shows actual gloss measurements of these samples after the paint dried. The amount of light reflectance at 85° of the dries painted samples was measured using a glossmeter.

The two painted Control samples had average glosses of about 16% and about 19% reflectance. The painted Formula 1 sample had an average gloss of about 16% reflectance. The painted Formula 2 sample with PEG had an average gloss of about 22% reflectance. Accordingly, the joint compound of Formula 1 with lecithin was closer to the control and would minimize flashing as compared to the joint compound with PEG.

Therefore, the dedusting and viscosity of joint compounds with low concentrations of phospholipids improve over joint compounds comprising known or no dedusting agents with minimal effect on other properties of the final dried joint compound. The actual gloss measurements are shown in TABLE 7.

TABLE 7

Gloss Measurements (% Reflectance)

| Control # 1 | Control #2 | Formula 2 with 2.0% PEG | Formula 1 with 0.5% Lecithin |
| --- | --- | --- | --- |
| 17 | 21 | 21 | 16.7 |
| 15 | 17.5 | 21.2 | 16.1 |
| 16.2 | 18.4 | 22 | 16.3 |
| 16.7 | 19.3 | 21.3 | 16.0 |
| 16.3 | 18.5 | 22.4 | |
| | 19.3 | | |

While particular versions of the invention have been shown and described, it will be appreciated by those skilled in the art that changes and modifications may be made thereto without departing from the invention in its broader aspects and as set forth in the following claims.

What is claimed is:

1. A joint compound comprising in weight percent on a dry basis:
about 25% to about 98% filler, about 1% to about 45% binder, and about 0.01% to about 3% phospholipid dedusting agent, wherein the phospholipid dedusting agent comprises one or more of phosphatidylcholine, phosphatidylserine, phosphatidylinositol, phosphatidylethanolamine, and phosphatidylglycerol.

2. The joint compound of claim 1, wherein the joint compound is a drying-type joint compound,
wherein the joint compound comprises in weight percent on a dry basis:
the filler, wherein the filler comprises:
a primary filler at about 50 weight percent (wt %) to about 98 wt % of the joint compound on a dry basis, wherein the primary filler is calcium carbonate, calcium sulfate dihydrate, or talc, or a mixture thereof, and
a secondary filler at up to about 25 wt % of the joint compound on a dry basis;
about 1 wt % to about 15 wt % the binder;
about 0.01 wt % to about 3 wt % the phospholipid dedusting agent;
wherein the joint compound further comprises in weight percent on a dry basis about 0.05 wt % to about 3 wt % a polymer thickener.

3. The joint compound of claim 1, wherein the joint compound is a drying-type joint compound,
further comprising water;
wherein the joint compound comprises joint compound components other than the water comprising in weight percent on a dry basis:
the filler, wherein the filler comprises:
a primary filler at about 50 weight percent (wt %) to about 98 wt % of the joint compound on a dry basis, wherein the primary filler is calcium carbonate, calcium sulfate dihydrate, or talc, or a mixture thereof, and
a secondary filler at up to about 25 wt % of the joint compound on a dry basis;
about 1 wt % to about 15 wt % said binder;
about 0.01 wt % to about 3 wt % said phospholipid dedusting agent;
wherein the joint compound components other than the water further comprise in weight percent on a dry basis about 0.05 wt % to about 3 wt % a polymer thickener; and
wherein a weight ratio of the water to the joint compound components other than the water is about 1:6 to about 2:1.

4. The joint compound of claim 1, wherein the joint compound has an absence of calcined gypsum.

5. A method comprising:
applying the joint compound of claim 1 to a surface;
drying and/or setting the joint compound; and
dry or wet sanding the joint compound after drying and/or setting.

6. A joint compound consisting essentially of in weight percent on a dry basis:
about 25% to about 98% filler,
about 1% to about 45% binder, and
about 0.01% to about 3% phospholipid dedusting agent,
wherein the phospholipid dedusting agent consists essentially of one or more phospholipids conjugated with one or more of a polyethylene glycol, a polyethylene oxide, a fluorescent dye, a chromogenic dye, a protein, a peptide, a carbohydrate, a sterol, a fatty acid, and a synthetic polymer.

7. The joint compound of claim 6, wherein the phospholipid dedusting agent consists essentially of one or more of phosphatidylcholine, phosphatidylserine, phosphatidylinositol, phosphatidylethanolamine, and phosphatidylglycerol conjugated with one or more of polyethylene glycol, polyethylene oxide, fluorescent dye, chromogenic dye, protein, peptide, carbohydrate, sterol, fatty acid, and synthetic polymer.

8. The joint compound of claim 6, wherein the phospholipid dedusting agent consists essentially of one or more phospholipids conjugated with one or more of polyethylene oxide, fluorescent dye, chromogenic dye, protein, peptide, carbohydrate, sterol, fatty acid, and synthetic polymer.

9. The joint compound of claim 6, wherein there is an absence of surfactant other than the phospholipid dedusting agent.

10. A method comprising:
applying the joint compound of claim 6 to a surface;
drying and/or setting the joint compound; and
dry or wet sanding the joint compound after drying and/or setting.

11. A setting-type joint compound comprising in weight percent on a dry basis:
a calcium sulfate hemihydrate at about 20 weight percent (wt %) to about 99 wt % of the setting-type joint compound on a dry basis;
up to about 30% filler,
up to about 8 wt % the binder;
up to about 2 wt % the polymer thickener; and
about 0.01% to about 3% phospholipid dedusting agent,
wherein the phospholipid dedusting agent comprises one or more of phosphatidylcholine, phosphatidylserine, phosphatidylinositol, phosphatidylethanolamine, and phosphatidylglycerol.

12. The setting-type joint compound of claim 11, which comprises in weight percent on a dry basis:
   about 20 weight percent (wt %) to about 99 wt % the calcium sulfate hemihydrate;
   up to about 30 wt % the filler;
   about 0.5 wt % to about 8 wt % the binder;
   about 0.01 wt % to about 3 wt % the phospholipid dedusting agent; and
wherein the joint compound further comprises in weight percent on a dry basis:
about 0.05 wt % to about 2 wt % polymer thickener.

13. The setting-type joint compound of claim 11, further comprising water and a set retarder, and
wherein the joint compound comprises joint compound components other than the water in weight percent (wt %) on a dry basis comprising:
   about 20 wt % to about 99 wt % calcium sulfate hemihydrate;
   up to about 30 wt % the filler;
   up to about 8 wt % the binder;
   up to about 2 wt % the polymer thickener;
   about 0.01 wt % to about 3 wt % the phospholipid dedusting agent; and
   about 0.001 wt % to about 2 wt % the set retarder;
wherein a weight ratio of the water to joint compound components other than water is about 1:6 to about 2:1.

14. A method comprising:
   applying the setting-type joint compound of claim 11 to a surface;
   drying and/or setting the setting-type joint compound; and
   dry or wet sanding the setting-type joint compound after drying and/or setting.

15. A setting-type joint compound consisting essentially of in weight percent on a dry basis:
   a calcium sulfate hemihydrate at about 20 weight percent (wt %) to about 99 wt % of the setting-type joint compound on a dry basis;
   up to about 30% filler,
   up to about 8 wt % the binder;
   up to about 2 wt % the polymer thickener; and
   about 0.01% to about 3% phospholipid dedusting agent, wherein the phospholipid dedusting agent consists essentially of one or more phospholipids conjugated with one or more of a polyethylene glycol, a polyethylene oxide, a fluorescent dye, a chromogenic dye, a protein, a peptide, a carbohydrate, a sterol, a fatty acid, and a synthetic polymer.

16. The setting-type joint compound of claim 15, wherein the phospholipid dedusting agent consists essentially of one or more of phosphatidylcholine, phosphatidylserine, phosphatidylinositol, phosphatidylethanolamine, and phosphatidylglycerol conjugated with one or more of polyethylene glycol, polyethylene oxide, fluorescent dye, chromogenic dye, protein, peptide, carbohydrate, sterol, fatty acid, and synthetic polymer.

17. The setting-type joint compound of claim 15 having an absence of surfactant other than the phospholipid dedusting agent.

18. The setting-type joint compound of claim 15, wherein the phospholipid dedusting agent consists essentially of one or more phospholipids conjugated with one or more of polyethylene oxide, fluorescent dye, chromogenic dye, protein, peptide, carbohydrate, sterol, fatty acid, and synthetic polymer.

19. A method comprising:
   applying the setting-type joint compound of claim 15 to a surface;
   drying and/or setting the setting-type joint compound; and
   dry or wet sanding the setting-type joint compound after drying and/or setting.

* * * * *